United States Patent
Frea et al.

(10) Patent No.: US 11,878,671 B2
(45) Date of Patent: Jan. 23, 2024

(54) METHOD FOR MANAGING BRAKING IN A DEGRADED ADHESION CONDITION FOR A VEHICLE SYSTEM

(71) Applicant: FAIVELEY TRANSPORT ITALIA S.P.A., Piossasco (IT)

(72) Inventors: Matteo Frea, Turin (IT); Luc Imbert, Turin (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 592 days.

(21) Appl. No.: 15/734,160

(22) PCT Filed: May 31, 2019

(86) PCT No.: PCT/IB2019/054518
§ 371 (c)(1),
(2) Date: Dec. 1, 2020

(87) PCT Pub. No.: WO2019/229709
PCT Pub. Date: Dec. 5, 2019

(65) Prior Publication Data
US 2021/0213920 A1    Jul. 15, 2021

(30) Foreign Application Priority Data

Jun. 1, 2018  (IT) .................... 102018000005948

(51) Int. Cl.
*B60T 8/17*    (2006.01)
*B60L 7/24*    (2006.01)
(Continued)

(52) U.S. Cl.
CPC .............. *B60T 8/1705* (2013.01); *B60L 7/24* (2013.01); *B60Q 9/00* (2013.01); *B60T 8/172* (2013.01);
(Continued)

(58) Field of Classification Search
CPC ...... B60T 8/1705; B60T 8/172; B60T 8/3235; B60T 13/586; B60T 2201/03;
(Continued)

(56) References Cited

U.S. PATENT DOCUMENTS 4,671,577 A    6/1987  Woods
9,248,811 B2 *  2/2016  Kato ................... B60T 7/22
(Continued)

FOREIGN PATENT DOCUMENTS

EP    1084922 A2    3/2001
EP    2918459 A1    9/2015
(Continued)

OTHER PUBLICATIONS

International Search Report dated Oct. 10, 2019 for corresponding Application No. PCT/IB2019/054518 (5 pages).
(Continued)

*Primary Examiner* — Tyler D Paige
(74) *Attorney, Agent, or Firm* — The Small Patent Law Group LLC; Christopher R. Carroll

(57) ABSTRACT

A system and method for managing braking in a degraded adhesion condition for a vehicle system including at least one vehicle comprising setting a target deceleration value, applying a non-degraded braking force via a braking system of the vehicle system, detecting a presence of a degraded adhesion condition between the vehicle system and a route along which the vehicle system moves. Responsive to the degraded adhesion condition not being detected, maintaining the application of the non-degraded braking force, or responsive to the degraded adhesion condition being detected, applying a degraded braking force, activating recovery means to control deceleration of the vehicle system, determining a compensation deceleration value, and
(Continued)

applying at least one of the braking system or recovery means to control the deceleration of the vehicle system.

16 Claims, 7 Drawing Sheets

(51) Int. Cl.
    *B60T 8/172*         (2006.01)
    *B60T 13/58*         (2006.01)
    *B60Q 9/00*          (2006.01)
    *B60T 8/32*          (2006.01)
    *B61H 11/00*         (2006.01)
    *B61H 11/14*         (2006.01)

(52) U.S. Cl.
    CPC .......... *B60T 8/3235* (2013.01); *B60T 13/586* (2013.01); *B61H 11/005* (2013.01); *B61H 11/14* (2013.01); *B60T 2201/03* (2013.01); *B60T 2210/12* (2013.01); *B60T 2250/04* (2013.01); *B60T 2270/402* (2013.01)

(58) Field of Classification Search
    CPC ............. B60T 2210/12; B60T 2250/04; B60T 2270/402; B60T 7/126; B60L 7/24; B60L 2200/26; B60L 2240/14; B60L 2240/647; B60L 15/2009; B60L 3/108; B60L 3/0015; B60Q 9/00; B61H 11/005; B61H 11/14; Y02T 10/64; Y02T 90/16; Y02T 10/72
    USPC .......................................................... 701/19
    See application file for complete search history.

(56) References Cited

U.S. PATENT DOCUMENTS

| | | | |
|---|---|---|---|
| 2013/0110368 A1* | 5/2013 | Zagorski | ................... B60T 7/22 701/70 |
| 2014/0246282 A1 | 9/2014 | Elstorpff et al. | |
| 2014/0303817 A1 | 10/2014 | Mayer et al. | |
| 2017/0267220 A1* | 9/2017 | Serra | ..................... F16D 65/092 |
| 2017/0334415 A1 | 11/2017 | Kumar et al. | |

FOREIGN PATENT DOCUMENTS

| | | |
|---|---|---|
| JP | H0796826 A | 4/1995 |
| JP | H11198810 A | 7/1999 |
| WO | 0071399 A1 | 11/2000 |
| WO | 2012052381 A1 | 4/2012 |
| WO | 2012076523 A1 | 6/2012 |
| WO | 2016207078 A1 | 12/2016 |

OTHER PUBLICATIONS

Written Opinion dated Oct. 10, 2019 for corresponding Application No. PCT/IB2019/054518 (7 pages).

* cited by examiner

METHOD FOR MANAGING BRAKING IN A DEGRADED ADHESION CONDITION FOR A VEHICLE SYSTEM

CROSS-REFERENCE TO RELATED APPLICATIONS

This application is a national stage application, filed under 35 U.S.C. § 371, of International Patent Application No. PCT/IB2019/054518, filed on 31 May 2019, which claims priority to Italian Patent Application No. 102018000005948, filed on 1 Jun. 2018. The entire disclosures of these applications are incorporated herein by reference.

BACKGROUND

Technical Field

The inventive subject matter is, in general, in the field of braking management methods for a vehicle system, such as a train.

Discussion of Art

Conventional brake management systems, under degraded adhesion conditions, base their operation on open-loop or closed-loop controls using, inter alia, the following measurement and/or feedback quantities: braking force, work of the braking force, wheel-rail adhesion, etc.

For example, document WO2016207078 describes the possibility of using braking force, documents WO2012076523, WO2012052381, WO0071399 describe the possibility of using the work of the braking force, EP2918459 describes the possibility of using the wheel-rail adhesion engaged during braking, and the possibility of using the acceleration of the vehicle is also known.

The aforesaid quantities may be measured and/or distributed and/or controlled at different levels, i.e. at the single axle level, at the railway wagon level (multiple axles) and at the train level (multiple railway wagons).

Depending on these quantities, conventional brake management systems act accordingly on a plurality of devices, including, inter alia, the devices responsible for applying the braking force and the devices responsible for improving the adhesion conditions of the rail or of the wheel-rail contact.

For example, the devices responsible for applying the braking force are pneumatic disc brakes (EP brake), pneumatic tread brakes (EP tread brake), electrodynamic brakes (ED brake), and magnetic track brakes (MTB).

On the other hand, the devices responsible for improving the conditions of adhesion of the rail or the wheel-rail contact are, for example, a sandbox or a magnetic shoe (MTB).

In conditions of degraded adhesion, since it is not possible to apply a nominal braking force on all axles, the braking management systems described above intervene with a series of strategies and/or devices, the objective of which is to return the vehicle to an instantaneous deceleration as close as possible to or equal to a target deceleration.

The expression 'nominal braking force' refers to a braking force which enables a 'target deceleration' to be achieved, i.e. the level of instantaneous deceleration which, if maintained throughout the braking period, enables the train to stop its travel within a target stopping distance.

Therefore, the conventional systems described above focus mainly on the instantaneous deceleration of the vehicle and have as their objective the achievement of the aforesaid target deceleration.

This type of approach presents a fundamental problem. Under degraded adhesion conditions, at best, it will be possible to reach the target deceleration after a certain delay with respect to the start of braking. The delay is due to a time necessary for the aforesaid systems to detect the conditions of degraded adhesion, to activate the devices described above and to give them time to act. At such point, following this delay, the target deceleration will be achieved. Disadvantageously, this target deceleration will no longer be sufficient to reach the target stopping distance and, as a result, the stopping distance of the train will increase relative to the envisaged target.

Taking a practical example, supposing a railway vehicle traveling 160 km/h, when at a time t=0 braking is activated, the target deceleration will be 1 m/s$^2$.

$$\text{Dec}_{obb}=1 \text{ m/s}^2 \tag{1}$$

In a dry rail scenario, i.e. in a condition of good adhesion, the full "nominal braking force" may be applied. The vehicle will then reach the target deceleration of 1 m/s 2 and maintain it throughout the braking process.

FIG. 1 shows the deceleration time profile in this condition.

As may be seen in this figure, the train will stop its travel within the target stopping distance, in this example equal to 990 m. This stopping distance value may be easily calculated by tracing the example condition back to the case of uniformly accelerated motion:

$$\text{Stopping time} = \frac{\text{initial speed}}{\text{average acceleration}} \tag{2}$$

$$\text{Stopping distance} = \tag{3}$$
$$\text{initial speed} * \text{Stopping time} - \frac{1}{2}\text{average deceleration} * \text{Stopping time}^2$$

FIG. 2 shows a braking curve that relates the speed of the vehicle to the distance traveled.

In a contaminated rail scenario, i.e. where there is a contaminant on the rail, e.g. water, oil, wet leaves, etc., it follows that the wheel-rail adhesion is degraded.

Considering the use, in this scenario, of a conventional braking management system according to the prior art described previously, in the first instance, it is not possible to apply the full nominal braking force, and therefore it is not possible to achieve the target deceleration of 1 m/s$^2$.

In the light of this gap in force and/or deceleration and/or adhesion, the conventional brake management systems described above activate strategies and/or devices for the recovery of adhesion which, at best, bring the deceleration of the vehicle to the target value with a certain delay, which in the example is assumed to be 10 seconds.

FIG. 3 illustrates the deceleration time profile in this second scenario.

With this deceleration profile, the vehicle will stop its travel in 1050 m, i.e., a stopping distance longer than the target stopping distance.

$$\text{Additional stopping distance}=\text{real stopping distance}-\text{target stopping distance} \tag{4}$$

In the present example:

$$\text{Additional stopping distance}=1050-990=60 \text{ m} \tag{5}$$

FIG. 4 shows a braking curve that relates the speed of the vehicle to the distance traveled.

In conclusion, conventional systems for managing degraded adhesion braking, while achieving their objective of bringing the deceleration of the vehicle to the target value, disadvantageously, do not achieve the objective of stopping the vehicle within the target stopping distance.

This could expose the train to an increased safety risk and possible accidents.

BRIEF SUMMARY

One of the objects of the inventive subject matter described herein is therefore to provide a system (e.g., a brake management system) that allows the achievement of the target stopping distance even in the event of a degraded adhesion condition, thereby increasing the overall safety level of a vehicle system during braking. While certain embodiments focus on rail vehicles as the vehicle systems, not all embodiments are limited to rail vehicles, such as trains. One or more embodiments can relate to other types of vehicles, such as mining vehicles, automobiles, trucks, or the like.

These and other objects and advantages are achieved, according to one aspect of the subject matter described herein, by a braking management method in a degraded adhesion condition for a vehicle system.

In summary, the embodiments propose a methodology for the control of braking (and related support devices) that bases operation on the deceleration of the vehicle and the distance traveled, with the objective of achieving a target stopping distance.

The proposed methodology is to compare not only the actual instantaneous deceleration with the target deceleration, but also to take into account the additional distance traveled by the vehicle in steps wherein the actual instantaneous deceleration is less than the target deceleration.

BRIEF DESCRIPTION OF THE DRAWINGS

The functional and structural features of some of the embodiments of a method for managing braking in a degraded adhesion condition for a vehicle will now be described. Reference is made to the accompanying drawings, wherein.

DETAILED DESCRIPTION

Figure 1:
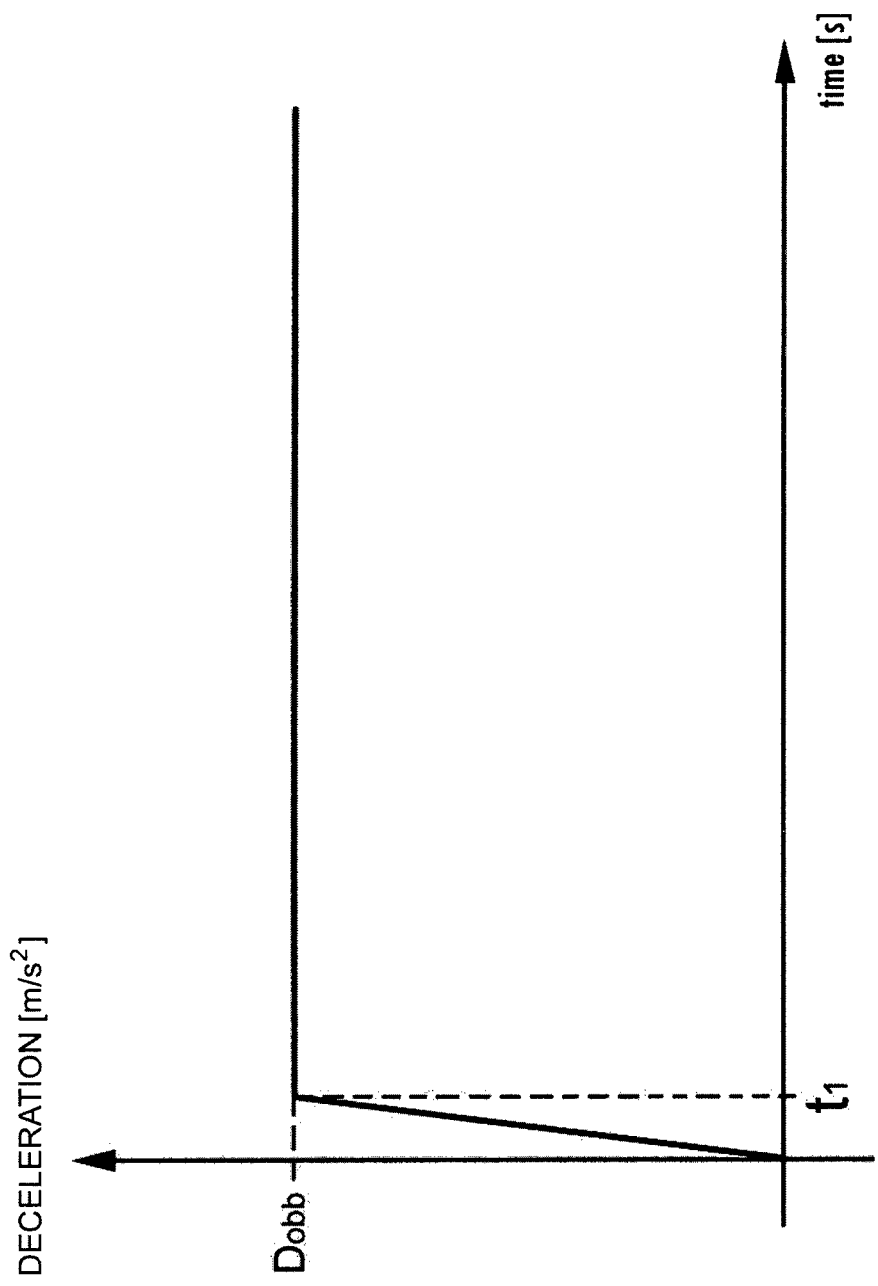
FIG. 1 is a graph illustrating a deceleration time profile with a continuous line in a dry route scenario.
Figure 2:
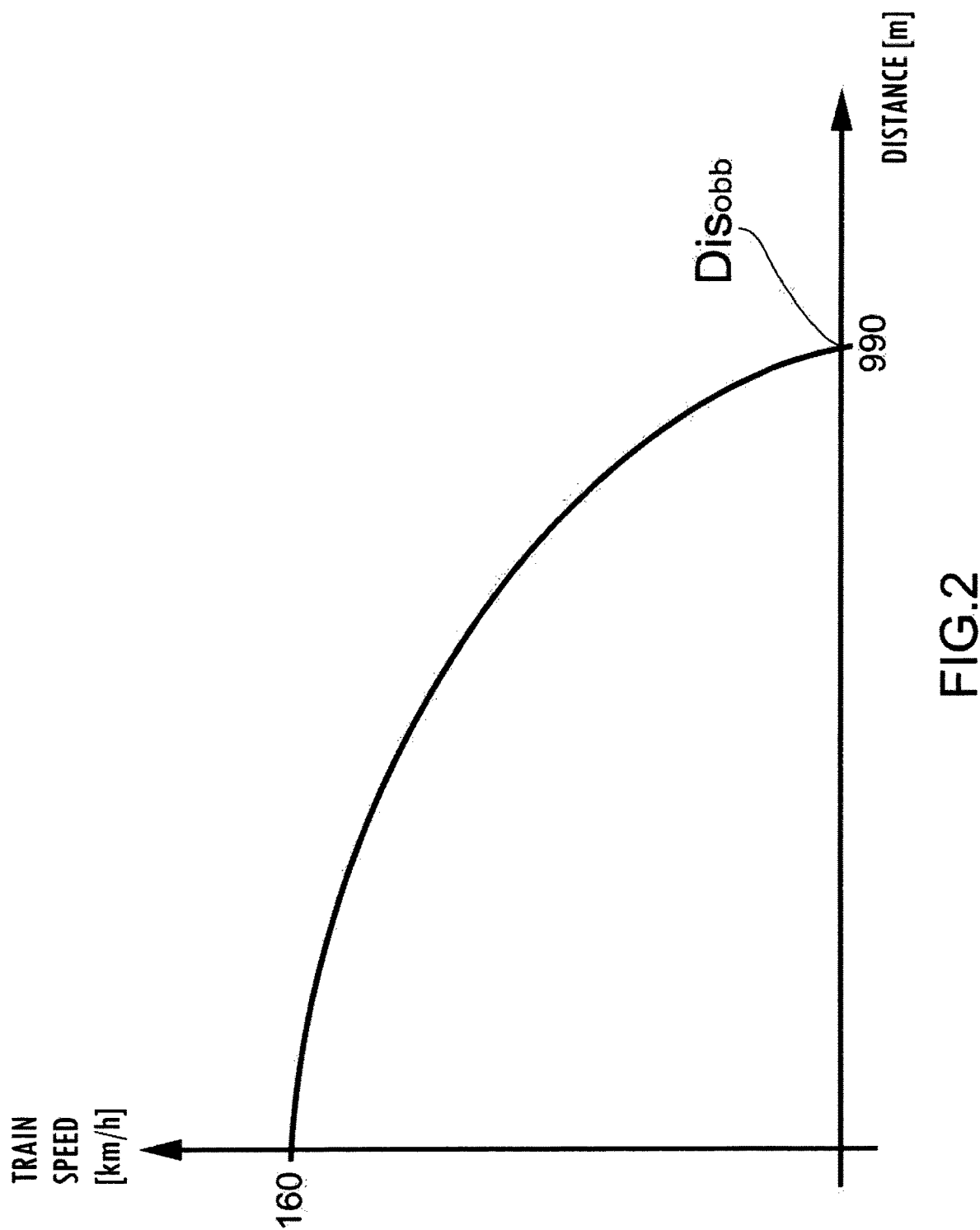
FIG. 2 is a graph illustrating a braking curve, with a continuous line, which relates the speed of the vehicle to the distance traveled in a dry route scenario.

Before explaining in detail a plurality of embodiments of the inventive subject matter, it should be clarified that the embodiments described herein are not limited in application to the constructive details and to the configuration of the components presented in the following description or illustrated in the drawings. Other embodiments may be assumed and may in practice be implemented or achieved in different ways. For example, while some embodiments described herein relate to rail vehicles, not all embodiments of the inventive subject matter are restricted to rail vehicles. One or more embodiments of the inventive subject matter may relate to other types or models of vehicles, such as automobiles, trucks, buses, mining vehicles, marine vessels, aircraft (manned and unmanned, such as drones), agricultural vehicles, or other off-highway vehicles. Additionally, the vehicles may be included in vehicle system that may include two or more different types of vehicles that may operate as a common vehicle system and may communicate with each other and/or an off-board control system.

It should also be understood that the phraseology and terminology have descriptive purposes and should not be construed as restrictive. The use of "include" and "comprise" and the variations thereof are to be understood as encompassing the elements stated hereinafter and the equivalents thereof, as well as additional elements and the equivalents thereof.

The method for managing braking in a degraded adhesion condition for a vehicle system including at least one vehicle according to one or more embodiments comprises a plurality of steps that will be analyzed individually hereinafter. A brake management system having hardware circuitry that includes and/or is connected with one or more processors can implement the method. The vehicle system may be a train including at least one railway vehicle that is configured to move along a track. Optionally, the vehicle and/or vehicle system may be an alternative vehicle system, and the route may be an alternative surface along which the vehicle system moves such as tracks, roads, highways, land-based paths, airborne paths, or the like. The vehicle system can have one or more controllers (e.g., hardware circuitry that includes and/or is connected with one or more processors) for performing the operations described herein.

One step comprises setting a target deceleration value $D_{obb}$ to be reached by the train. The target deceleration value $D_{obb}$ allows the train to reach a zero traveling speed in a target stopping distance $Dis_{obb}$.

Another step comprises applying, by at least one train braking means, (e.g., one or more of the controllers and/or a braking system, such as an air brake system) a non-degraded braking force $F_{nd}$. The value of the non-degraded braking force $F_{nd}$ is calculated in such a way as to enable the train to achieve the target deceleration value $D_{obb}$.

A further step comprises verifying the presence of a degraded adhesion condition between the railway vehicle and the rail along which the vehicle system travels.

If no degraded adhesion condition is detected, the method comprises the step of maintaining the application of the non-degraded braking force $F_{nd}$. The non-degraded braking force $F_{nd}$, will allow the train to reach the target deceleration value $D_{obb}$ within a first time t1 and will consequently allow the train to reach a zero traveling speed within the target stopping distance $Dis_{obb}$.

When a degraded adhesion condition is detected, the method will comprise:

a) the step of applying, by the braking means of the train, a degraded braking force $F_d$ lower than said non-degraded braking force $F_{nd}$ and coinciding with the maximum (or other upper limit that is less than a maximum) braking force applicable in such degraded adhesion condition, by sliding control means;

b) the step of activating recovery means arranged to control or positively influence the deceleration of the train. These recovery means allow the train to reach the target deceleration value $D_{obb}$ within a second time t2. The second time t2 is greater than the first time t1. The target deceleration value $D_{obb}$ in this case, would allow the train to reach a zero traveling speed in a degraded stopping distance $Dis_{deg}$. This degraded stopping distance $Dis_{deg}$ would be greater than the target stopping distance $Dis_{obb}$.

c) the step of determining a compensation deceleration value $D_{comp}$ as a function of the degraded stopping distance $Dis_{deg}$ due to the difference between the degraded braking force $F_d$ and the non-degraded braking force Ext. The compensation deceleration value $D_{comp}$ is arranged to allow the train to reach a zero traveling speed by the train within the target stopping distance $Dis_{obb}$, and not within the degraded stopping distance $Dis_{deg}$.

d) the step of applying, by means of at least one braking means and/or the recovery means arranged to control or positively influence the deceleration of the train, a compensation braking force. This compensation braking force is greater than the non-degraded braking force and is calculated as a function of the compensation deceleration value $D_{comp}$. This will allow the train to reach the compensation deceleration value $D_{comp}$ and to reach a zero traveling speed within the target stopping distance $Dis_{obb}$.

The train braking means may comprise an electromechanical brake, an electro-pneumatic brake, an electrodynamic brake, a pneumatic brake, and/or a hydraulic brake. Optionally, the braking means may include one or more controllers that control operation of the brake(s).

The aforementioned recovery means may be adhesion recovery means, such as, inter alia, at least a sandbox or a magnetic shoe. Otherwise, the recovery means may be braking means not dependent on the adhesion, such as, among others, at least one magnetic track brake or an eddy current brake.

It is clear that the adhesion recovery means may be used to increase adhesion between the wheel and the rail so as to allow the application of a braking force greater than the maximum applicable braking force (or other upper limit that is less than the maximum) during the condition of degraded adhesion, whereas braking means not dependent on the adhesion may be used to increase the deceleration of the train without increasing the braking force applied by the rail vehicle's braking means dependent on the adhesion, until the rail vehicle has left the condition of degraded adhesion so as to return again to a condition of non-degraded adhesion.

The rail vehicle in degraded adhesion condition will only be able to reach the target deceleration value $D_{obb}$ within a second time t2, greater than the first time t1, which, disadvantageously, would allow the train to reach a zero traveling speed by the train only within a degraded stopping distance $Dis_{deg}$ greater than the target stopping distance $Dis_{obb}$.

Therefore, since after the intervention of the recovery means, or after the railway vehicle has left the condition of degraded adhesion, for example when switching from a dirty section of track to a clean section of track, when the railway vehicle is again in a condition of non-degraded adhesion, it will be possible to apply a compensation braking force greater than the non-degraded braking force. The compensation braking force is calculated as a function of the compensation deceleration value $D_{comp}$, so that the train may reach the compensation deceleration value $D_{comp}$ and reach a zero traveling speed within the target stopping distance. The compensation braking force may be applied by means of at least one braking means and/or the recovery means arranged to positively influence the deceleration of the train, such as by indirect or direct control of the braking means and/or recovery means, such as by the controller, an operator of the vehicle system, or the like.

In other words, the compensation braking force must be greater than the non-degraded braking force so as to compensate for the braking force not applied during the degraded adhesion condition. The non-degraded braking force is not sufficient to compensate for the braking force not applied during the degraded adhesion condition.

The aforesaid degraded stopping distance $Dis_{deg}$ may be calculated, at certain instants of time, using the following formula:

$$Dis_{deg}(t) = \int_0^\tau \left( \int_0^\tau Dec(t)dt - \int_0^\tau Dis_{obb}dt \right) dt \quad (6)$$

where $Dis_{deg}(t)$ is the degraded stopping distance $Dis_{deg}$ measured at the time t, Dec(t) is an instantaneous deceleration value measured at the time t and $Dis_{obb}$ is the target deceleration value.

Figure 7:
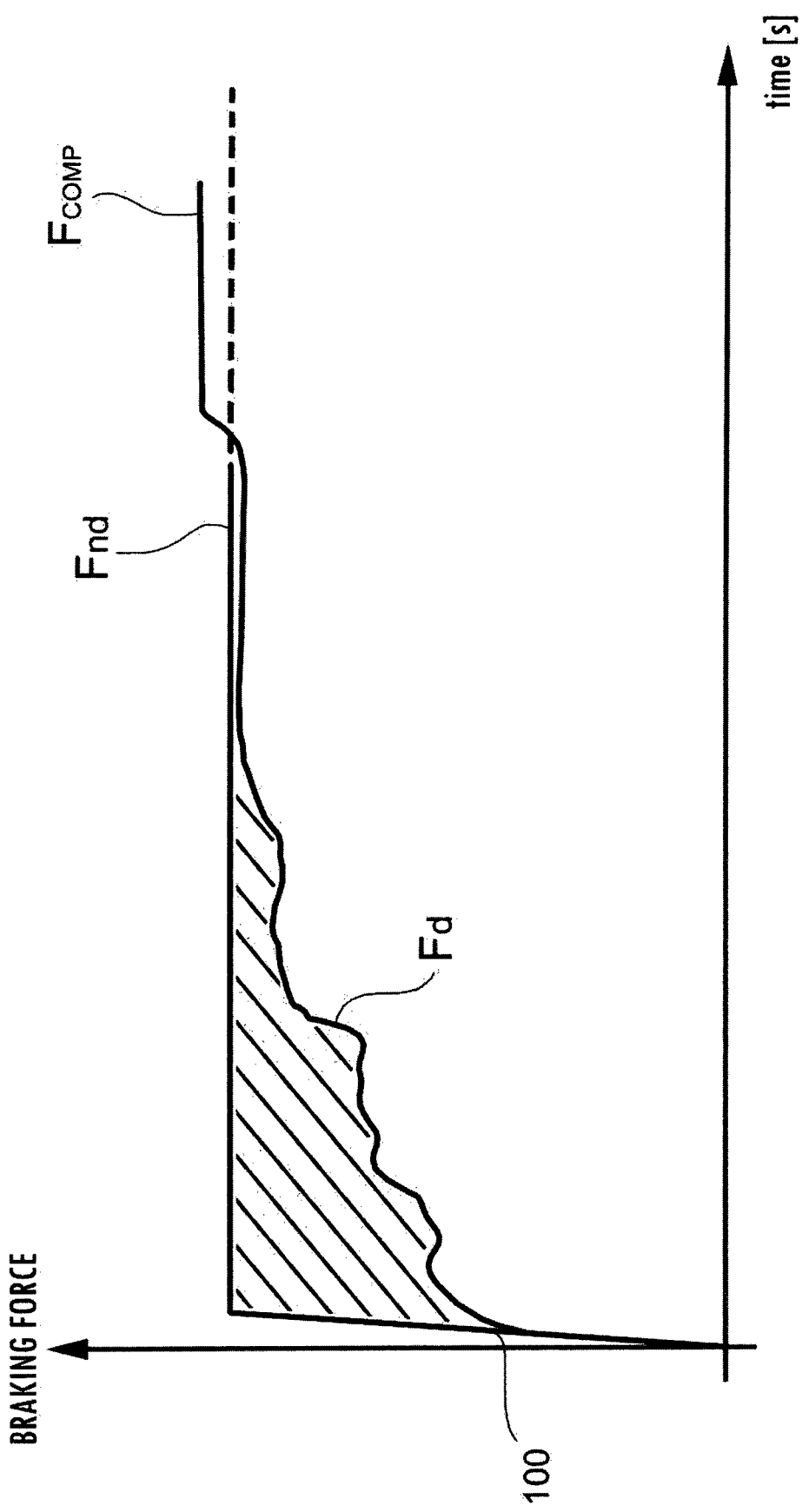
FIG. 7 is a graph illustrating a non-degraded braking force $F_{nd}$ and a degraded braking force $F_d$.

In FIG. 7 one may observe an exemplifying trend of a non-degraded braking force $F_{nd}$ and a degraded braking force $F_d$. Point 100 indicates the moment wherein the sliding control means cause a degraded braking force $F_d$ to be applied, which is lower than said non-degraded braking force Fnd. The part shown by the inclined lines indicates the braking force that would have been applied in the case of non-degraded adhesion, but which was not applied due to the degraded adhesion condition. It would be that non-applied braking force that would determine an additional stopping distance. $F_{comp}$ indicates the braking force that is applied as a result of the degraded braking force Fd in order for the train to reach the compensation deceleration value $D_{comp}$.

Taking a practical example, an "additional distance" is the difference between the distance traveled by the vehicle decelerating with real deceleration $Dec_r$ and the distance that the vehicle would have traveled decelerating with the target deceleration $Dec_{obb}$.

Acceleration is defined as the temporal derivative of the velocity vector. Considering a rectilinear motion, it is possible to identify a speed vector with the absolute value of the rail vehicle's traveling speed.

In turn, the speed is the time derivative of the distance traveled by the vehicle along the rail.

$$a = \frac{dv}{dt} = \frac{d^2s}{dt^2} \quad (7)$$

Integrating twice in relation to time gives the general equation of the motion.

The distance traveled along the rail (unidirectional case) is the double integral of the acceleration with respect to time.

$$s = \int \int_0^\tau a(t) dt dt \quad (8)$$

In a dry rail scenario, the wheel-rail grip allows the rail vehicle to brake with target deceleration during the entire braking period. This situation may be traced back to the case of uniformly accelerated motion, wherein the acceleration of the vehicle does not depend on time.

$$Dec_r(t) = Dec_{obb} \quad (9)$$

Therefore, the distance traveled at time t in dry rail conditions may be expressed as $$s_1 = \int\int_0^t Dec_{obb} dt dt \quad (10)$$

Figure 6:
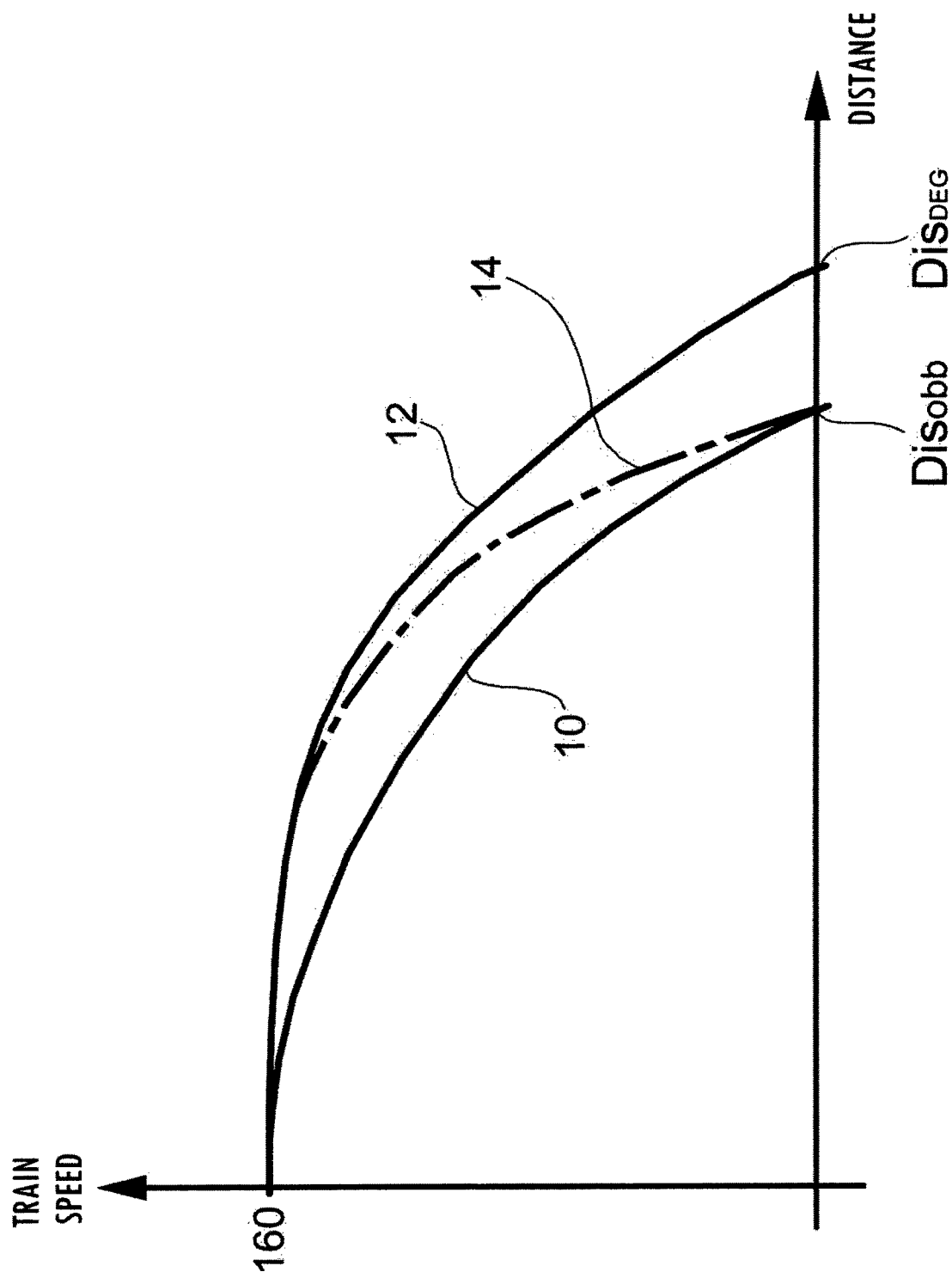
FIG. 6 is a graph illustrating, with a dash-dotted line, a braking curve that relates the speed of the vehicle to the distance traveled.

In this scenario, the train speed will have a trend like the curve 10 in FIG. 6.

Figure 3:
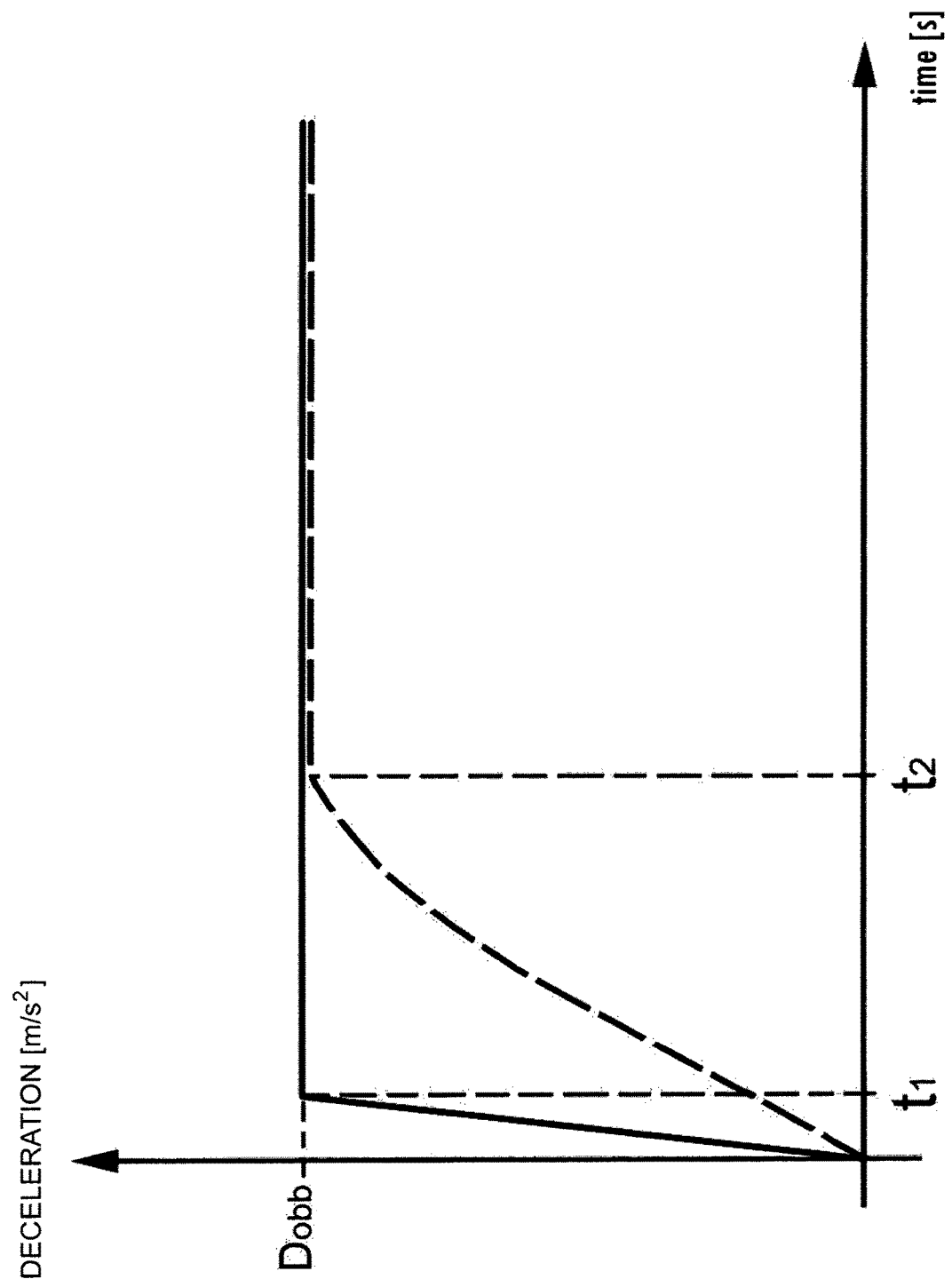
FIG. 3 is a graph further illustrating, with a dotted line, a deceleration time profile in a contaminated route scenario.
Figure 4:
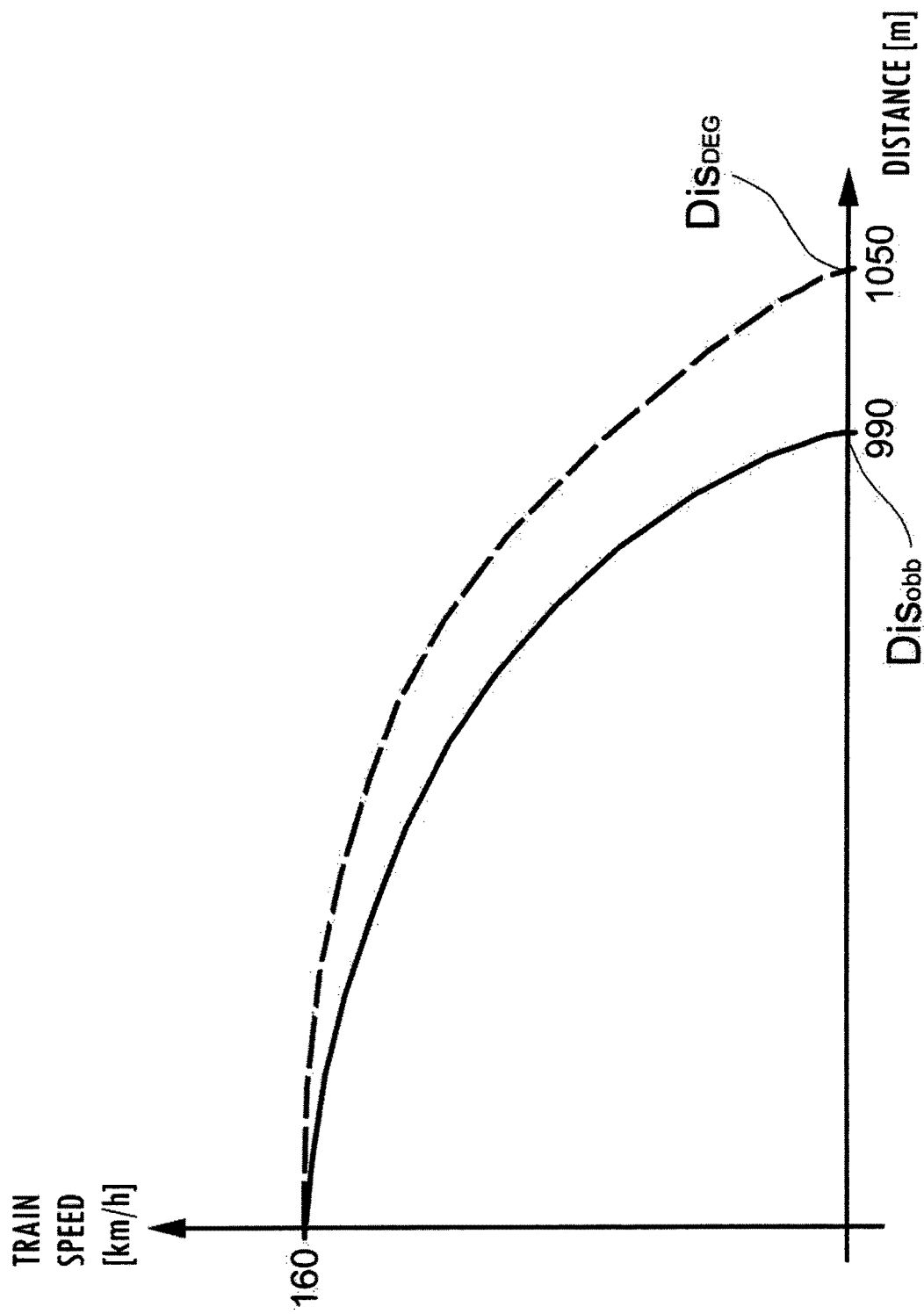
FIG. 4 is a graph further illustrating, with a dotted line, a braking curve that relates the speed of the vehicle to the distance traveled in a contaminated route scenario.

On the other hand, considering a degraded adhesion scenario, the vehicle is not allowed to decelerate with constant deceleration during the entire braking period. The deceleration profile may be, for example, that of FIG. 3 or different, but in any case, the acceleration of the vehicle is a function of the time.

Therefore the distance traveled at the time t in degraded adhesion conditions may be expressed as $$s_2 = \int\int_0^t Dec_r(t) dt dt \quad (11)$$

The additional distance at the instant t is the difference between the distance traveled in the case of degraded adhesion and the distance traveled in the case of non-degraded adhesion.

$$\Delta s(t) = s_2 - s_1 = \int_0^t \left( \int_0^t Dec_r(t) dt - \int_0^t Dec_{obb} dt \right) dt \quad (12)$$

As mentioned above, the method according to the subject matter described herein aims to stop the travel of the vehicle within the target stopping distance even in conditions of degraded adhesion. The method will therefore have to act in order to minimize or otherwise reduce the additional distance:

$$\Delta s(t) \to 0 \quad (13)$$

Considering a generic braking control system installed for example on an electronic control unit, it will work in a discrete time system with a sampling time $\Delta t$, being $\Delta t$ the execution period of the control loop.

In this context, the time elapsed at the instant t will be given by the number of executions of the control loop multiplied by the time elapsed between one execution of the control loop and the next.

$$t = n\Delta t \quad (14)$$

Where n is the number of control loop executions up to a certain instant t.

In this discrete context, the temporal integrals become sums of the incremental deviations and the additional distance traveled by the vehicle at the time t becomes:

$$\Delta s(n) = s_2 - s_1 = \sum_0^n \left( \sum_0^n (Dec_n) - Dec_{obb} * n \right) \quad (15)$$

Where $Dec_n$ is the deceleration of the vehicle at the n-th execution of the control loop.

A discrete method, based on this methodology, will control the braking (and the relative support devices) to minimize or otherwise reduce the additional distance:

$$\Delta s(n) \to 0 \quad (16)$$

If the additional distance is not minimized (or, optionally, reduced), the train speed will follow a trend like the curve 12 in FIG. 6.

On the other hand, by minimizing (or optionally reducing) and modulating at each execution (n) of the control loop, the target deceleration $Dec_{obb}$ in order to maintain the following equality:

$$\sum_0^n \left( \sum_0^n (Dec_n) - Dec_{obb} * n \right) = 0 \quad (17)$$

Taking as an example of application of the method object of the subject matter described herein, considering a contaminated rail scenario with degraded wheel-rail adhesion, in the first instance the degraded braking force will be applied, but due to the presence of a degraded adhesion condition, the sliding control means will intervene, which will not allow the application of all the non-degraded braking force $F_{nd}$, but will only allow the application of a degraded braking force $F_d$. In this case, it is therefore not possible to reach the target deceleration, for example set at 1 m/s².

Figure 5:
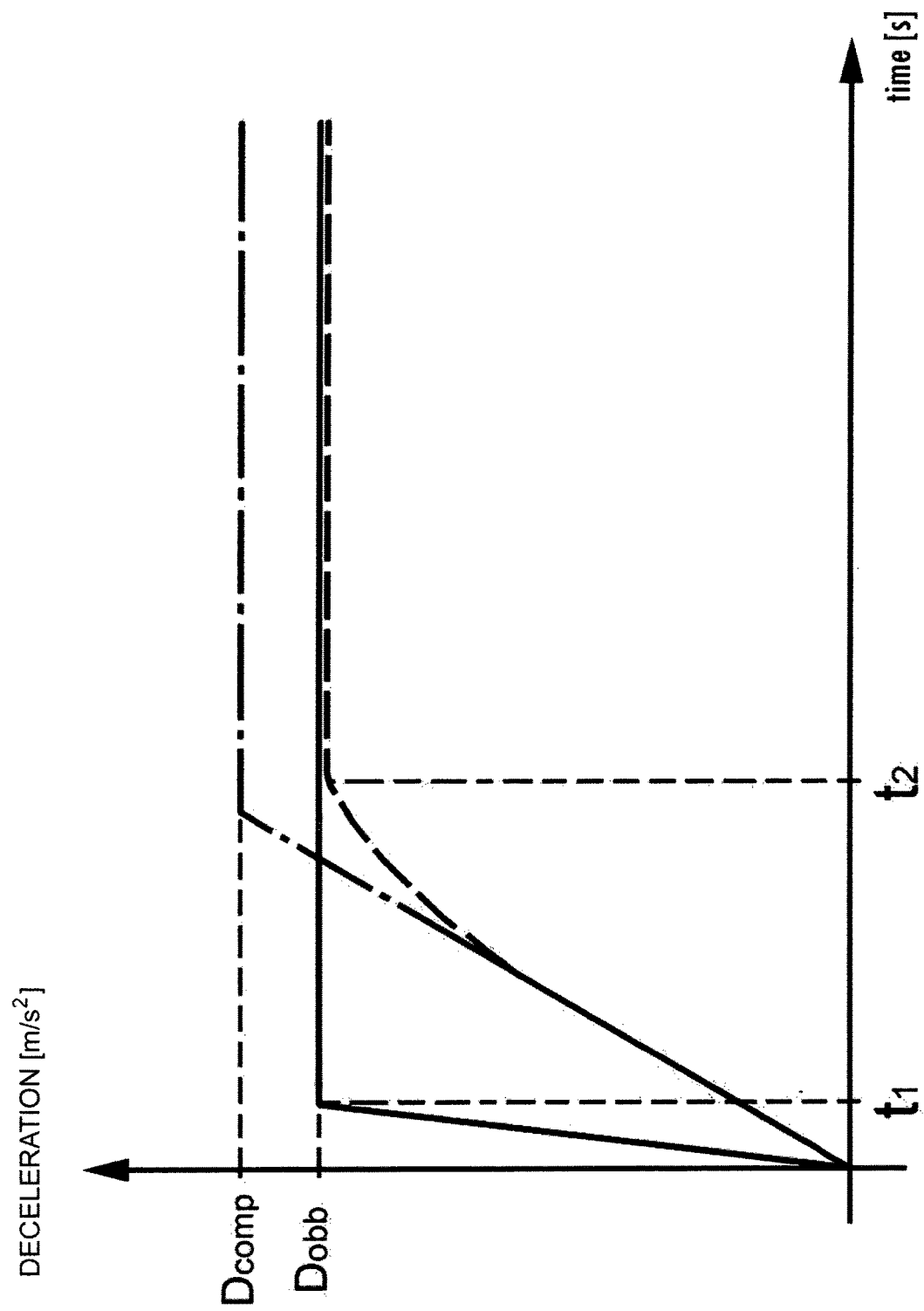
FIG. 5 is a graph illustrating, with a dash-dotted line, a deceleration profile.

By applying the control methodology that is the object of the subject matter described herein, one obtains, for example, a deceleration profile as illustrated in FIG. 5 and the speed of the train will have a trend as indicated in FIG. 6 at number 14.

The method according to the inventive subject matter described herein, in order to minimize or reduce the degraded stopping distance $Dis_{deg}$ which comprises the target stopping distance $Dis_{obb}$ plus an additional stopping distance, sets a compensation deceleration value $D_{comp}$ which is higher than the target deceleration value $D_{obb}$ for a certain braking step.

With this deceleration profile, the train stops its travel at 990 m, i.e. within the target stopping distance $Dis_{obb}$ and not within the degraded stopping distance $Dis_{deg}$.

For example, the target stopping distance $Dis_{obb}$ may be calculated as a function of an initial traveling speed of the train, of an average deceleration value obtained through the average of the deceleration values obtained from the instant in which the non-degraded braking force $F_{nd}$ is applied, up to the moment wherein the train reaches a zero traveling speed, and a target braking time obtained through the ratio between the initial traveling speed of the train and said average deceleration value. This target stopping distance $Dis_{obb}$ may be calculated using the following formula:

$$Dis_{obb} = \text{Initial speed} * \text{target braking time} - \frac{1}{2} \text{Average deceleration} * \text{target braking time}^2 \quad (18)$$

In one embodiment of the method for managing braking in a degraded adhesion condition, the compensation braking force may be less than a maximum braking limit (or other upper limit that is less than the maximum). In other words, one may avoid the method applying too high a braking value which would lead to an excessively abrupt braking and which could jeopardize the safety and comfort of passengers on board the train. In addition, this limit may allow the reduction of the applicable braking force such that such applied braking force may not exceed the safety standards dictated by the appropriate regulations (e.g. LOC & PAS TSI).

In a further embodiment, the method for managing braking in a degraded adhesion condition may further comprise the step of providing a signal to the driver or operator, or to a dedicated control infrastructure when the compensation braking force exceeds the non-degraded force value $F_{nd}$. In this way, it will be possible to warn the train driver or the appropriate infrastructure that the method has encountered a condition such as to have required the activation thereof to compensate for the degraded adhesion condition.

At least one advantage of the subject matter described herein is therefore to be able to stop the travel of a train within a target stopping distance, even in degraded adhesion conditions, minimizing or reducing an additional stopping distance that is usually generated because of the degraded adhesion condition.

Various aspects and embodiments of a method for managing braking in a degraded adhesion condition for a train including at least one rail vehicle according to the inventive subject matter have been described. It is understood that each embodiment may be combined with any other embodiment. The embodiments, moreover, is not limited to the described embodiments, but may vary within the scope defined by the accompanying claims.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The clauses define the patentable scope of the disclosure, and include other examples that occur to those of ordinary skill in the art. Such other examples are intended to be within the scope of the clauses if they have structural elements that do not differ from the literal language of the clauses, or if they include equivalent structural elements with insubstantial differences from the literal language of the clauses.

What is claimed is:

1. A method comprising:
    setting a target deceleration value to be reached by a vehicle system comprising at least one vehicle, the target deceleration value set using one or more processors of a brake management system, the target deceleration value set to allow the vehicle system to reach a zero traveling speed within a target stopping distance and within a first time;
    applying a non-degraded braking force using at least one braking system of the vehicle system, a value of the non-degraded braking force calculated by the one or more processors of the brake management system to obtain the target deceleration value;
    checking a presence of a degraded adhesion condition between the vehicle system and a route along which the vehicle system moves using the one or more processors of the brake management system; and one or more of:
        (a) responsive to the degraded adhesion condition not being detected, maintaining application of the non-degraded braking force with the at least one braking system of the vehicle system, which will allow the vehicle system to reach the target deceleration value within a first time and allow the vehicle system to achieve accordingly a zero traveling speed within the target stopping distance; or
        (b) responsive to the degraded adhesion condition being detected:
            applying a degraded braking force with the at least one braking system that is lower than the non-degraded braking force and coinciding with an upper limit braking force based on the degraded adhesion condition;
            activating a rail vehicle sandbox, a magnetic shoe, a magnetic track brake, or an eddy current brake to control deceleration of the vehicle system using the one or more processors of the brake management system, the rail vehicle sandbox, the magnetic shoe, the magnetic track brake, or the eddy current brake allowing the vehicle system to reach the target deceleration value within a second time that is greater than the first time to allow the vehicle system to reach a zero traveling speed within a degraded stopping distance that is greater than the target stopping distance;
            determining a compensation deceleration value as a function of the degraded stopping distance based on one or more difference between the degraded braking force and the non-degraded braking force using the one or more processors of the brake management system, the compensation deceleration value being arranged by the one or more processors of the brake management system to allow the vehicle system to reach a zero traveling speed within the target stopping distance; and
            applying at least one of: the at least one braking system or the rail vehicle sandbox, the magnetic shoe, the magnetic track brake, or the eddy current brake to control one or more of the deceleration of the vehicle system or a compensation braking force using the one or more processors of the brake management system, the compensation braking force being greater than the non-degraded braking force and based on the compensation deceleration value, to the compensation braking force allowing the vehicle system to reach the compensation deceleration value and to reach the zero traveling speed within the target stopping distance.

2. The method of claim 1, wherein the target stopping distance is based on one or more of an initial traveling speed of the vehicle system, an average deceleration value based on an average of one or more deceleration values obtained during application of the non-degraded braking force, up to when the vehicle system reaches the zero traveling speed, and a target braking time obtained through a ratio between an initial traveling speed of the vehicle system and the average deceleration value.

3. The method of claim 2, wherein the target stopping distance is represented by $Dis_{obb}$ and is calculated based on:

$$Dis_{obb} = \text{Initial speed} * \text{target braking time} - \frac{1}{2}\text{Average deceleration} * \text{target braking time}^2.$$

4. The method of claim 1, wherein the compensation braking force is lower than a braking limit.

5. The method of claim 1, further comprising:
providing a signal to an operator of the vehicle system responsive to the compensation braking force exceeding a value of non-degraded force.

6. The method of claim 1, wherein the degraded stopping distance is determined at certain instants of time based on:

$$Dis_{deg}(t) = \int_0^t \left( \int_0^t Dec(t)dt - \int_0^t Dis_{obb}dt \right) dt$$

where $Dis_{deg}(t)$ is the degraded stopping distance measured at a time t, $Dec(t)$ is an instantaneous deceleration value measured at the time t and $Dis_{obb}$ is the target deceleration value.

7. The method of claim 1, wherein the at least one braking system comprises one of an electromechanical brake, an electro-pneumatic brake, an electrodynamic brake, a pneumatic brake, or a hydraulic brake.

8. A brake management system, comprising:
one or more processors configured to set a target deceleration value to be reached by a vehicle system comprising at least one vehicle, the target deceleration value allowing the vehicle system to reach a zero traveling speed within a target stopping distance and within a first time, the one or more processors configured to direct at least one braking system of the vehicle system to apply a non-degraded braking force, a value of the non-degraded braking force calculated to obtain the target deceleration value, the one or more processors configured to check a presence of a degraded adhesion condition between the vehicle system and a route along which the vehicle system moves, wherein:
responsive to the degraded adhesion condition not being detected, the one or more processors are configured to direct the at least one braking system to maintain application of the non-degraded braking force, which will allow the vehicle system to reach the target deceleration value within a first time and allow the vehicle system to achieve accordingly a zero traveling speed within the target stopping distance; or
responsive to the degraded adhesion condition being detected, the one or more processors are configured to direct the at least one braking system to:
apply a degraded braking force with the braking system that is lower than the non-degraded braking force and coinciding with an upper limit braking force based on the degraded adhesion condition;
activate a recovery means arranged to control deceleration of the vehicle system, the recover means allowing the vehicle system to reach the target deceleration value within a second time that is greater than the first time to allow the vehicle system to reach a zero traveling speed within a degraded stopping distance that is greater than the target stopping distance;
determine a compensation deceleration value as a function of the degraded stopping distance based on one or more difference between the degraded braking force and the non-degraded braking force, the compensation deceleration value being arranged to allow the vehicle system to reach a zero traveling speed within the target stopping distance; and
apply at least one of the braking system or the recovery means to control one or more of the deceleration of the vehicle system or a compensation braking force, the compensation braking force being greater than the non-degraded braking force and based on the compensation deceleration value, to the compensation braking force allowing the vehicle system to reach the compensation deceleration value and to reach the zero traveling speed within the target stopping distance.

9. The brake management system of claim 8, wherein the one or more processors are configured to determine the target stopping distance based on one or more of an initial traveling speed of the vehicle system, an average deceleration value based on an average of one or more deceleration values obtained during application of the non-degraded braking force, up to when the vehicle system reaches the zero traveling speed, and a target braking time obtained through a ratio between an initial traveling speed of the vehicle system and the average deceleration value.

10. The brake management system of claim 9, wherein the one or more processors are configured to calculate the target stopping distance as $Dis_{obb}$ based on:

$$Dis_{obb} = \text{Initial speed} * \text{target braking time} - \frac{1}{2}\text{Average deceleration} * \text{target braking time}^2.$$

11. The brake management system of claim 8, wherein the compensation braking force is lower than a braking limit.

12. A method comprising:
determining a target deceleration value to be reached by a vehicle system within a first time period that causes the vehicle system to stop within a target stopping distance within a first time, the target deceleration value determined using one or more processors of a brake management system;
applying a non-degraded braking force using at least one braking system of the vehicle system that obtains the target deceleration value;
determining whether a degraded adhesion condition between the vehicle system and a route along which the vehicle system moves exists using the one or more processors of the brake management system; and
responsive to the degraded adhesion condition being determined:
applying a degraded braking force with the at least one braking system that is lower than the non-degraded braking force;

controlling deceleration of the vehicle system using the at least one braking system to reach the target deceleration value within a longer second time that is longer than the first time to allow the vehicle system to reach a zero traveling speed within a degraded stopping distance that is longer than the target stopping distance;

determining a compensation deceleration value as a function of the degraded stopping distance using the one or more processors of the brake management system and based on one or more differences between the degraded braking force and the non-degraded braking force; and applying the braking system using the at least one braking system to control one or more of the deceleration of the vehicle system or a compensation braking force, the compensation braking force being greater than the non-degraded braking force and based on the compensation deceleration value.

13. The method of claim 12, wherein the target stopping distance is based on one or more of an initial traveling speed of the vehicle system, an average deceleration value based on an average of one or more deceleration values obtained during which the non-degraded braking force is applied, and a target braking time obtained through a ratio between an initial traveling speed of the vehicle system and the average deceleration value.

14. The method of claim 12, wherein the compensation braking force is smaller than a braking limit.

15. The method of claim 12, further comprising:
providing a signal to an operator of the vehicle system responsive to the compensation braking force exceeding a value of non-degraded force.

16. The method of claim 12, wherein the degraded stopping distance is determined based on an instantaneous deceleration value and the target deceleration value.

* * * * *